W. N. BRITTON.
TRACTION WHEEL AND RUNNER FOR VEHICLES.
APPLICATION FILED JUNE 18, 1908.
905,405.
Patented Dec. 1, 1908.
2 SHEETS—SHEET 1.
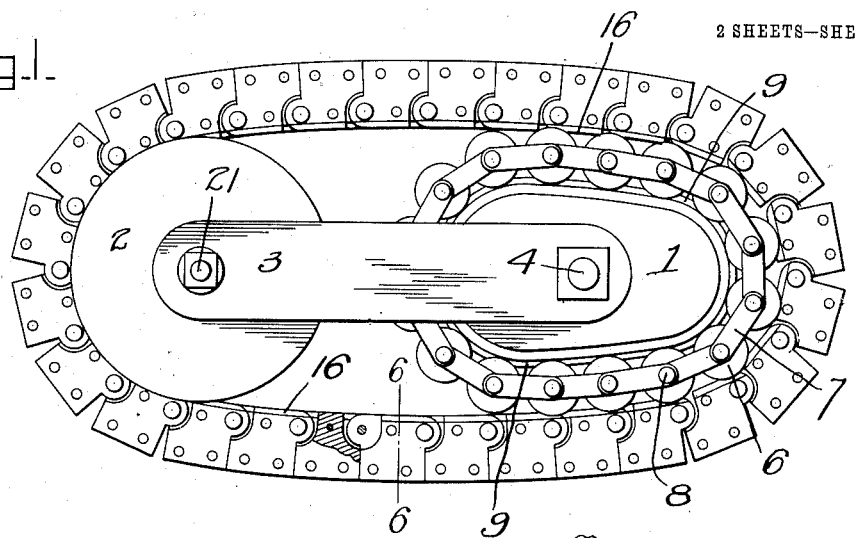
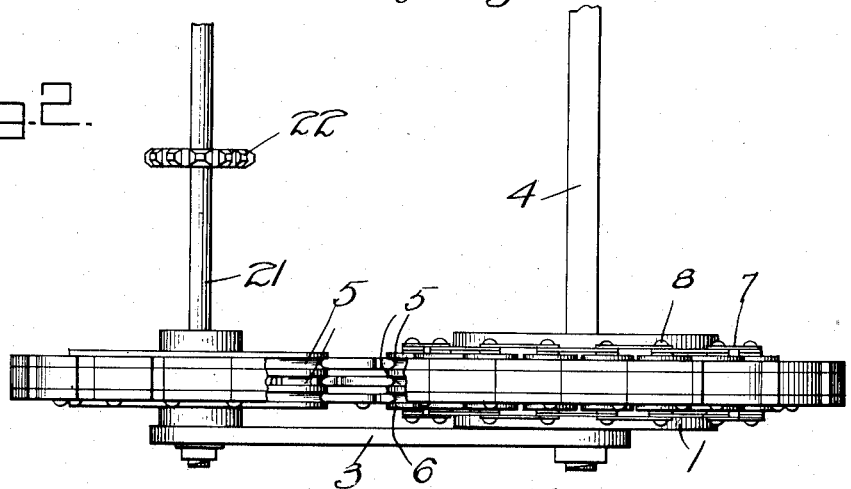
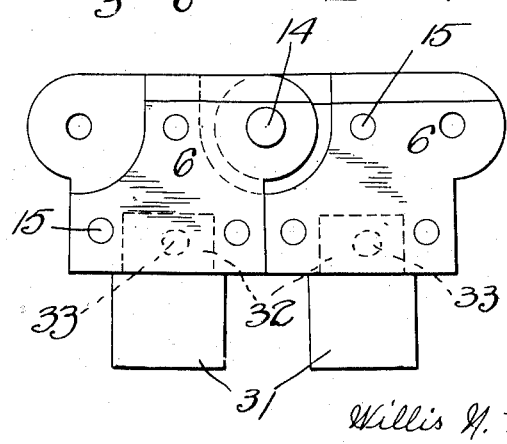
Witnesses
J. C. Miller
A. M. Whitmore.
Inventor
Willis N. Britton,
By E. B. Whitmore,
Attorney

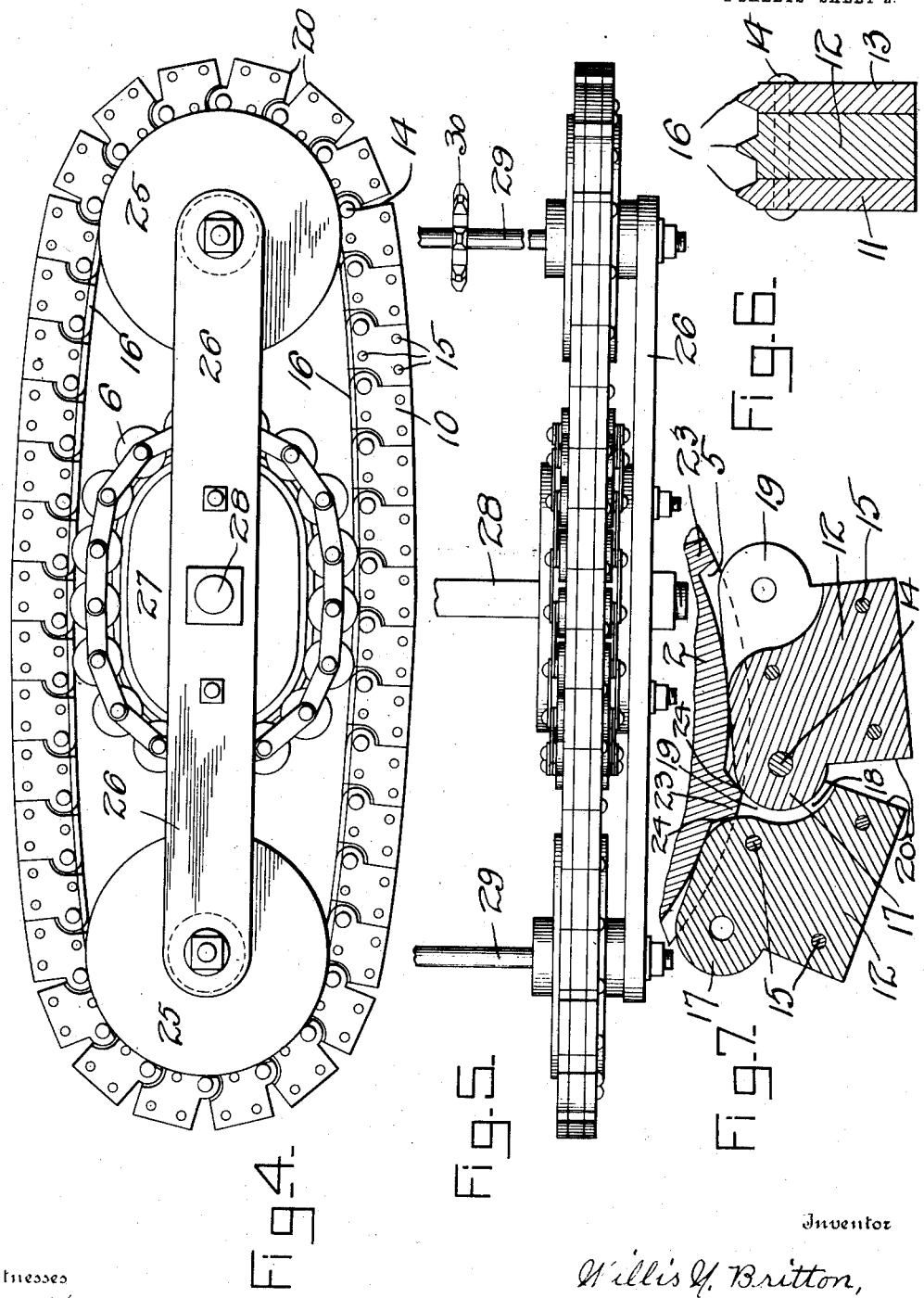

UNITED STATES PATENT OFFICE.

WILLIS N. BRITTON, OF ROCHESTER, NEW YORK.

TRACTION-WHEEL AND RUNNER FOR VEHICLES.

No 905,405.   Specification of Letters Patent.   Patented Dec. 1, 1908.

Application filed June 18, 1908. Serial No. 439,104.

*To all whom it may concern:*

Be it known that I, WILLIS N. BRITTON, of Rochester, in the county of Monroe and State of New York, have invented a new and useful Improvement in Traction-Wheels and Runners for Vehicles, which improvement is fully set forth in the following specification and shown in the accompanying drawings.

This invention relates to certain new and useful improvements in traction wheels or runners for vehicles of that class embodying an articulated member such as a chain traveling over rollers or the like and constituting the tread of the runner.

The present invention has for its objects among others to provide an improved traction wheel or runner of this general character, having among other novel features the following characteristics;—

First; the links are so formed with abutting parts as to be rigid against a tendency to bend the runner into a straight line, while it may bend easily in the other direction to form the oval. On account of this form of the link the oval runner or track will maintain its oval form against a heavy inward pressure against its slightly curved sides.

Second; the idlers and the rollers are formed with peripheral grooves, and the coöperating faces of the links are formed with corresponding longitudinal V-shaped tracks or ridges coöperating with said grooves whereby the parts cannot become relatively displaced laterally.

Third; the alternated links are of novel construction, and are so constructed that they break joints, with all the parts of each link relatively immovable and as a single piece.

Fourth; the chain of links or runner is given a flat oval form so as to readily twist or turn on the ground as the vehicle is turned one way or the other in its course, being capable of turning on the ground as with a swivel motion.

Other objects and advantages of the invention will hereinafter appear and the novel features thereof will be particularly pointed out in the appended claims.

The invention is capable of embodiment in a variety of forms some of which only are herein illustrated, the accompanying drawings, together with the numerals of reference marked thereon, forming a part of this specification, and in which Figure 1 is a side elevation of a runner embodying the present invention. Fig. 2 is a top plan thereof showing the axle, portions being broken away. Fig. 3 is an enlarged side elevation of a portion of the tread showing feet applied thereto. Fig. 4 is a side elevation of a modified form. Fig. 5 is a top plan thereof with portions broken off. Fig. 6 is a transverse section on the line 6—6 of Fig. 1. Fig. 7 is an enlarged section lengthwise of the tread, showing also a portion, in section, of the coöperating wheel provided with teeth for engaging the links of the chain.

Like numerals of reference indicate like parts throughout the several views.

Referring to the drawings 1, in Figure 1, designates an elliptical or egg-shaped member and 2 an idler, the latter being circular in form and the two connected upon their outer faces in any suitable manner, as by the horizontal bar 3 secured in any suitable manner so as to keep them relatively in place and pressed against the inner ends respectively of the track chain of links. The idler 2 revolves while the egg-shaped member 1 is relatively motionless. It is to be understood that two of the runners hereinafter described are used in connection with a vehicle axle, one at either end, the form of axle not being essential, neither is the manner of mounting the vehicle body or other member thereupon. The ends of the axle 4 are secured rigidly to the members 1 in any suitable manner, a bolster, not shown, being usually employed to receive the wagon body or load, as is common in this class of devices. This, however, will depend somewhat upon the use to which the runners are to be put, it being intended to employ the runners in all uses to which such devices are applicable, including moving buildings etc. In case it is desired to use the runners for a wagon or for a four wheeled vehicle, either heavy or light, to be drawn by horses, four of these runners will be employed, one at each end of the two axles, taking the place of the ordinary wheels. It will be understood, however, that even more may be employed if desired, according to the desired length of the vehicle.

The idler 2 has the same radius as the smaller end of the egg-shaped member 1 and the rollers thereupon, or rather the radius reaching out to the outer surfaces of the rollers at said little end, so that the form and curve of the oval track or runner is the same at either end, as clearly shown in Fig. 1.

The member 1 and the idler 2, as well as the rollers forming the chain movable over the member 1, are all grooved upon their peripheries, the grooves being substantially V-shaped, as seen at 5, to fit the V-shaped tongues or projections of the inner face of the alternated links of the runner soon to be described. By this construction, a vehicle provided with my improved form of runners will run along a side hill or road that is lower at one side than the other, with the vehicle correspondingly inclining; the V-shaped cracks and grooved rollers and idler preventing the parts from becoming relatively displaced laterally.

6 are rollers grooved upon their outer peripheries, as above described, each roller in this instance being shown as provided with three parallel grooves, and the adjacent rollers are connected by means of links pivotally mounted at their overlapped ends upon the ends of the shafts 8 of the rollers. The grooves of these rollers receive the V-shaped teeth or projections 9 of the egg-shaped member 1 upon the one side and the V-shaped teeth of the links of the chain, soon to be described, upon the other side.

The outer links 10 forming the runner or track are formed in three pieces, 11, 12 and 13, as seen best in Fig. 6, joined by horizontal pivot bolts 14. These links are put together so as to break joints, as seen best in Fig. 1, the middle piece being thicker than the outer pieces, as shown most clearly in Fig. 6. They are secured together by a suitable means, as shown at 15. These links have their inner edges grooved to form the three longitudinal V-shaped tracks or ridges 16, as seen most clearly in Fig. 6, running in the grooves of the outer peripheries of the egg-shaped member 1, the idler 2 and the rollers 6, as above described. The center-piece of each link is formed at one end with a knuckle 17 which is received within a correspondingly shaped opening 18 with the adjacent end of the next link, the outer members of the link being formed with correspondingly shaped knuckles 19 which embrace the center knuckle 17, the pivot pin 14 passing through coincident openings in all of these knuckles, as will be readily understood upon reference to Figs. 1, 6 and 7. The adjacent end of each link is formed with a square shoulder 20 extending outward from the knuckles, as seen best in Fig. 7, the construction being such that the said track or runner formed of these links may be bent freely in one direction to form an oval, but is rigid against a bend in the other direction owing to the said square shoulders 20 meeting and squarely abutting so as to form rigid stops against a tendency to bend into a straight line, as will be understood upon reference to Figs. 1, 3 and 4. The importance of this form of link will be obvious when it is noted that the runner or chain of links is made oval, being made wider at the middle than at the ends. It is given this form so that it may easily turn or swing laterally on the ground as with a swivel motion when it is desired to turn the vehicle around. By forming the links as above described so that their square portions will rigidly abut against each other, the oval track or runner maintains its oval or convex form of sides while under a stress of heavy load. The substantially flat curved edges of the egg-shaped member 1 are parallel with the opposing inner faces of the links so that the grooved rollers 6 have equal bearing along both the sides of the said member 1 and also around the smaller ends.

21 is a shaft designed to connect the opposite idlers 2, extending across, similar to and parallel with the axle and upon which is mounted a sprocket wheel 22, as seen in Fig. 2, rigid with the shaft so that when desired I may use such shaft and the wheels as drivers for the vehicle, employing a simple motor of known construction mounted on the vehicle, but not herein shown, and designed to drive said shaft by means of a sprocket chain engaging said sprocket wheel in a well known manner.

While in many instances the idlers will run by friction, I employ, especially for heavy work, the construction seen in Fig. 7 in which the idlers are provided, preferably in their center groove, with teeth 23 projecting into the joints between the adjacent ends of the center links of the chain or runner, said joints being open for this purpose. The teeth are short and the V-shaped track of the middle parts of the links are tapered or beveled at both ends, as seen at 24, so as to form a flaring opening therebetween, as shown clearly in Fig. 7, for the purpose of receiving these teeth. It is to be understood, however, that in some instances these teeth may be omitted.

I may sometimes, and particularly for heavier work, desire to lengthen the chain of links or runner forming the tread, and in Figs. 4 and 5 I have shown the embodiment of the invention in such a modified form. The essential features, as above described in connection with Figs. 1 and 2, are all substantially the same except that in this form I employ an idler 25 at each end of a rigid connecting bar 26, the intermediate member 27 being disposed at the center with its series of rollers, and the axle 28 connecting opposite members 27. In this form of the device, the member 27 instead of being egg-shaped, as in Fig. 1, partakes of the form of the oval chain or runner at the middle, being circular and alike at both ends. Shafts 29 connect opposite idlers and on one of the said shafts is a sprocket wheel 30 for the same purpose as the sprocket wheel 22, shown in Fig. 2. It is to be understood that the rollers 6, the idlers, and the links forming the outer chain or tread are in all respects similar to those hereinbefore particularly described with reference to the form shown in Figs. 1 and 2.

In some instances I may employ shoes or feet in connection with the links of the tread. These may assume any desired form and may be united to the links in any suitable manner.

In Fig. 3 I have shown one efficient form, the same being illustrated at 31 and shown as having shanks 32 which are retained within the bodies of the links by suitable means as the rivets or pins 33. These shoes or feet may project any desired distance from the face of the links and may be of any desired form in cross section and of any suitable material. They will be found efficient in going over soft ground, or they may be made of rubber or have their acting faces roughened to serve on icy or slippery ground.

When driven by a motor, as above intimated, the device assumes the nature of a traction engine.

Various other modifications in detail may be resorted to without departing from the spirit of the invention or sacrificing any of its advantages.

What is claimed as new is:—

1. A vehicle runner of the class described, embodying an oval shaped link tread portion, an idler within the same, a relatively stationary member, and an endless band of rollers intermediate the same and the tread portion.

2. A vehicle runner of the class described, embodying an oval shaped link tread portion, an idler within the same, a relatively stationary member, an endless band of rollers intermediate the same and the tread portion, and means holding said idler and member in relatively fixed position.

3. A runner embodying an oval shaped link tread portion, an idler within the same, a relatively stationary member also within the tread portion, and an endless chain of rollers interposed between said member and tread and having portions interengaging with both thereof.

4. A runner embodying an oval shaped link tread portion, an idler within the same, a relatively stationary member also within the tread portion, an endless chain of rollers interposed between said member and tread and having portions interengaging with both thereof, and means joining said member and idler to hold them in relatively fixed position.

5. In a runner, a link tread portion, an idler within the same, a relatively fixed member also within the tread portion, an endless band of rollers around said member, and means for holding said parts against relative displacement laterally.

6. In a runner, a link tread portion, an idler within the same, a relatively fixed member also within the tread portion, an endless band of rollers around said member, means for holding said parts against relative displacement laterally, and means connecting said idler and member to hold them in fixed relative positions.

7. In a device of the character described, an endless link tread portion, the links of which have projections, an idler having its periphery provided with grooves to receive said projections, and rollers within the tread portion also grooved to receive said projections.

8. In a device of the character described, an endless link tread portion, the links of which have projections, an idler having its periphery provided with grooves to receive said projections, rollers within the tread portion and grooved to receive said projections, and a relatively fixed member within the rollers having projections engaging the grooves thereof.

9. In a device of the character described, an endless link tread portion, the links of which have projections, an idler having its periphery provided with grooves to receive said projections, rollers within the tread portion and grooved to receive said projections, a relatively fixed member within the rollers having projections engaging the grooves thereof, and means connecting the idler and member to hold them in relatively fixed positions.

10. In a runner of the class described, a tread portion formed of links pivotally united and provided with means forming rigid stops against a tendency to bend into a straight line, an oval member within said tread portion, an idler connected with said oval member, and an endless band of rollers around said oval member and coöperating with the tread portion.

11. In a runner of the class described, a tread portion formed of links pivotally united and provided with means forming rigid stops against a tendency to bend in a straight line, said links having V-shaped projections on their inner faces.

12. In a device of the character described, a chain formed of alternated links arranged to break joints, said links being formed in sections and said sections relatively immovable and provided with projections upon their inner faces and having interengaging knuckles and recesses with their abutting faces at right angles to form stops and their inner faces formed with projections and said projections beveled at their adjacent ends.

13. In a device of the character described, a chain formed of alternated links arranged to break joints, said links being formed in sections and said sections relatively immovable and provided with projections upon their inner faces and having interengaging knuckles and recesses with their abutting faces at right angles to form stops and their inner faces formed with projections and said projections beveled at their adjacent ends, combined with an idler having its periphery grooved.

14. In a device of the character described, a chain formed of alternated links arranged to break joints, said links being formed in sections and said sections relatively immovable and provided with projections upon their inner faces and having interengaging knuckles and recesses with their abutting faces at right angles to form stops and their inner faces formed with projections and said projections beveled at their adjacent ends, combined with an idler having its periphery grooved and formed with teeth.

In witness whereof, I have hereunto set my hand this 15th day of June, 1908, in the presence of two subscribing witnesses.

WILLIS N. BRITTON.

Witnesses:
E. B. WHITMORE,
A. M. WHITMORE.